United States Patent
Blenkush et al.

(10) Patent No.: US 6,273,125 B1
(45) Date of Patent: Aug. 14, 2001

(54) COMPRESSION KEY LOCKOUT DEVICE FOR A GATE VALVE

(75) Inventors: Robert A. Blenkush, St. Cloud; Keith V. Warzecka, St. Joseph, both of MN (US)

(73) Assignee: SPX Corporation, Muskegon, MI (US)

( * ) Notice: Subject to any disclaimer, the term of this patent is extended or adjusted under 35 U.S.C. 154(b) by 0 days.

(21) Appl. No.: 09/704,035

(22) Filed: Nov. 1, 2000

(51) Int. Cl.[7] ................................................ F16K 35/00
(52) U.S. Cl. ............................. 137/383; 137/90; 137/111
(58) Field of Search ........................... 137/383; 251/90, 251/111

(56) References Cited

U.S. PATENT DOCUMENTS

| | | | | |
|---|---|---|---|---|
| 5,394,715 | * | 3/1995 | Guerette | 70/177 |
| 5,560,233 | * | 10/1996 | Watkins | 70/177 |
| 6,044,860 | * | 4/2000 | Neu | 137/385 |

* cited by examiner

Primary Examiner—A. Michael Chambers
Assistant Examiner—Thomas L. McShane
(74) Attorney, Agent, or Firm—Pepper Hamilton LLP

(57) ABSTRACT

A lockout device (12) operable to lock a valve (8) into a particular operating position and to prevent further actuation of the valve (8) until removed. The preferred lockout device (12) comprises two lock couplings (16,18), two lock plates (20,22), and two keys (24,26). Each lock coupling (16,18) presents first contact surfaces (40) and is threadably located upon and secured by a set screw (30,32) to an actuator shaft portion (14) of the valve (8) at shaft locations corresponding, respectively, to open and closed valve positions. Each lock plate (20,22) presents second contact surfaces (42) and is stationarily secured relative to the shaft (14) and operable to slidably pass the shaft (14) and receive a corresponding lock coupling (16,18). The keys (24,26) are substantially wedge-shaped and held parallel to one another by a spacer (38). The keys (24,26) are inserted to compressively engage the first and second contact surfaces (40,42) when the lock coupling (16,18) is received within and aligned with the lock plate (20,22), thereby preventing movement of the shaft (14) and lock coupling (16,18) relative to the stationary lock plate (20,22). The keys (24,26) may be subsequently withdrawn to allow the shaft (14) to resume movement.

13 Claims, 3 Drawing Sheets

COMPRESSION KEY LOCKOUT DEVICE FOR A GATE VALVE

BACKGROUND OF THE INVENTION

1. Field of the Invention

The present invention relates to gate valves for controlling material flow along a flowpath. More particularly, the invention relates to an adjustable lockout device using one or more compression keys to securely lock the gate valve in a desired operating position.

2. Description of the Prior Art

Those ordinarily skilled in the art will appreciate that it is often necessary or desirable to securely lock a flow control or gate valve in a particular operating position, typically either fully open or fully closed. This is true, for example, where the valve or associated downstream components are being repaired such that a change in actuation or flow state could be damaging to the valve or components or injurious to a worker. Locking the valve in a particular position is commonly accomplished using a lockout device fitted to the gate valve.

A number of conventional valves are not designed to be locked out, and must therefore be retrofitted with structure for selectively locking the valve. Those ordinarily skilled in the art will appreciate that it is virtually impossible to precisely retrofit a valve such that it can be reliably and accurately locked in a fully open, fully closed, or other exact position. Even where the effects of component tolerances can be minimized, subsequent wearing can result in a significant amount of "play" or movement of the valve even when locked.

Existing lockout devices include mounting (e.g., welding) a locking element to the valve assembly, the element having a hole which is aligned with some part of the valve. A pin is then inserted into the hole and engages the valve to prevent movement thereof. Unfortunately, actuation forces applied to the valve translate into shearing forces on the pin. Thus, the ability of such a lockout device to prevent movement is limited to the shear strength of the pin, which is typically 66% to 70% of its yield.

Furthermore, a number of existing lockout devices are not tamperproof, and consequently may be removed by unauthorized personnel or workers having no knowledge that the valve should remain locked out.

SUMMARY OF THE INVENTION

The present invention solves the above-described and other problems and provides a distinct advance in the art of gate valve lockout devices. More particularly, the present invention provides an adjustable lockout device using a key or wedge to securely lock the valve in a desired operating position.

The preferred lockout device comprises two lock couplings, two lock plates, and two keys. Each lock coupling presents tapered first contact surfaces and is threadably positioned upon and secured by a set screw to a valve actuator shaft portion of the gate valve at shaft locations corresponding, respectively, to valve open and valve closed positions. Each lock plate presents second contact surfaces and is stationarily secured relative to the shaft, operable to allow the shaft to slidably pass therethrough, and operable to receive a corresponding lock coupling. The keys are substantially wedge-shaped and held parallel to one another by a spacer. The keys are inserted to compressively engage the first and second contact surfaces when the lock coupling is received within and aligned with the lock plate, thereby preventing movement of the actuator shaft and lock coupling relative to the stationary lock plate. The keys may be subsequently withdrawn to allow the shaft to resume movement.

Because it is adjustable, the inventive lockout device provides for a greater range of lockout positions as well as for compensatory adjustments over time as parts wear and tolerances change. Another advantage of the present device is that actuation forces applied to the valve translate into compressive forces rather than shearing forces. Because the strength of a material in compression is equal to 100% of its yield, the lockout device of the present invention has improved ability to prevent movement of the valve. Furthermore, a lock attachment point is provided on each key whereby a padlock, cotter pin, or other locking means can be attached to prevent unauthorized or accidental removal of the key and disengagement of the lockout device.

These and other novel features of the present invention are described in more detail in the section entitled DESCRIPTION OF A PREFERRED EMBODIMENT, below.

BRIEF DESCRIPTION OF THE DRAWING FIGURES

A preferred embodiment of the present invention is described in detail below with reference to the attached drawing figures, wherein.

Figure 5:
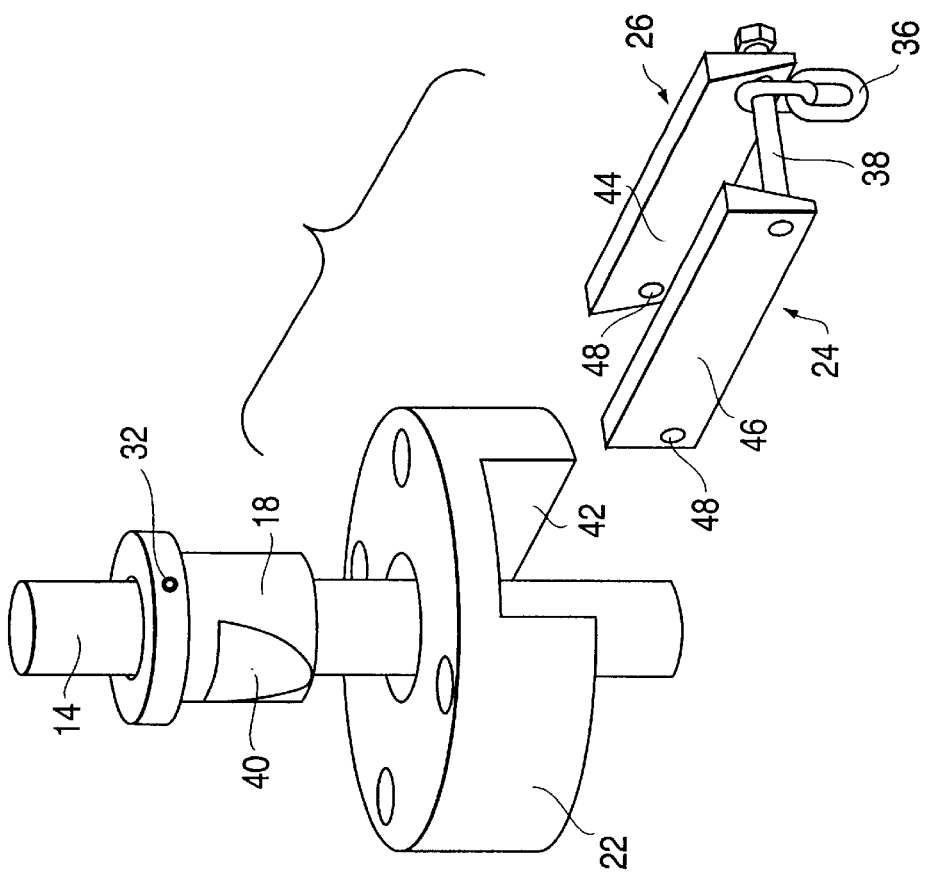
Figure 3:
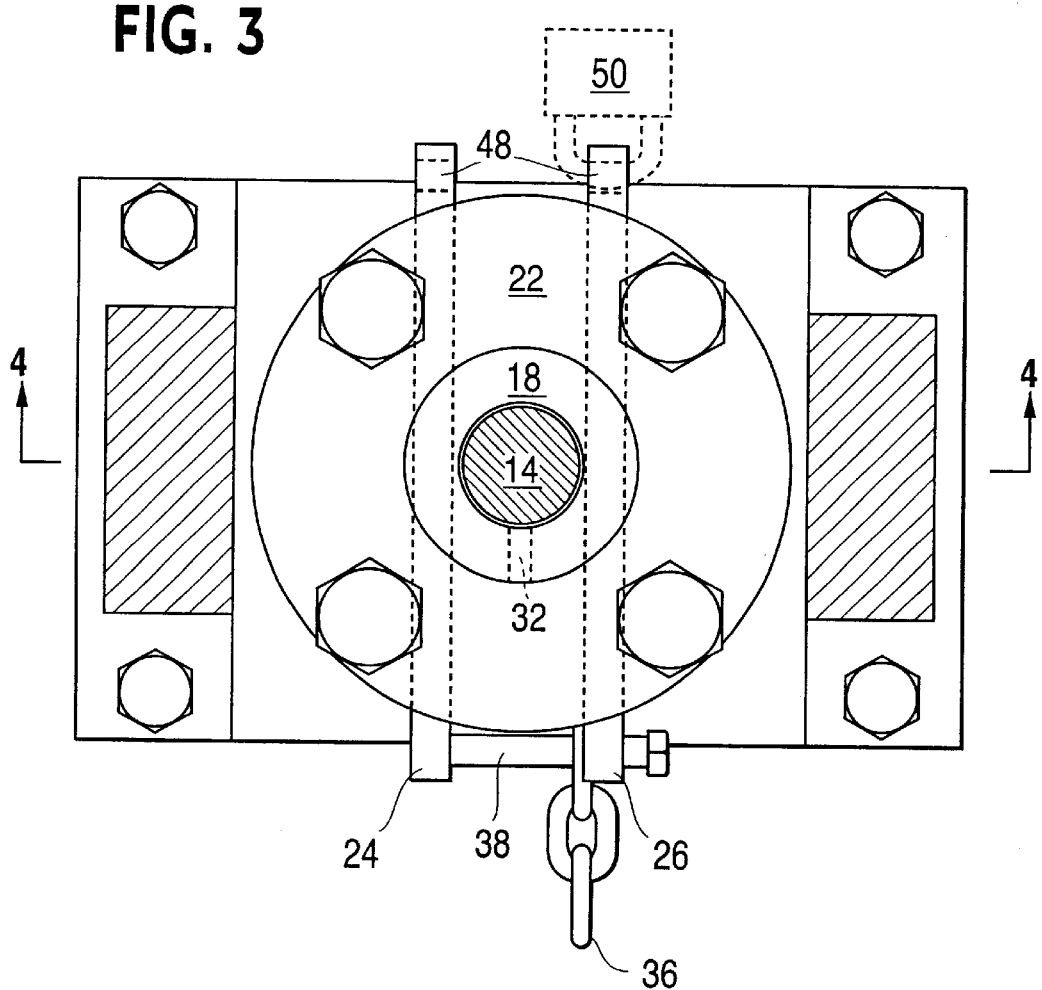
FIG. 3 is a horizontal cross-sectional view taken along line 3—3 of FIG. 1 and showing the viewable and non-viewable interaction of various components of a lockout device corresponding to a preferred embodiment of the present invention.
Figure 4:
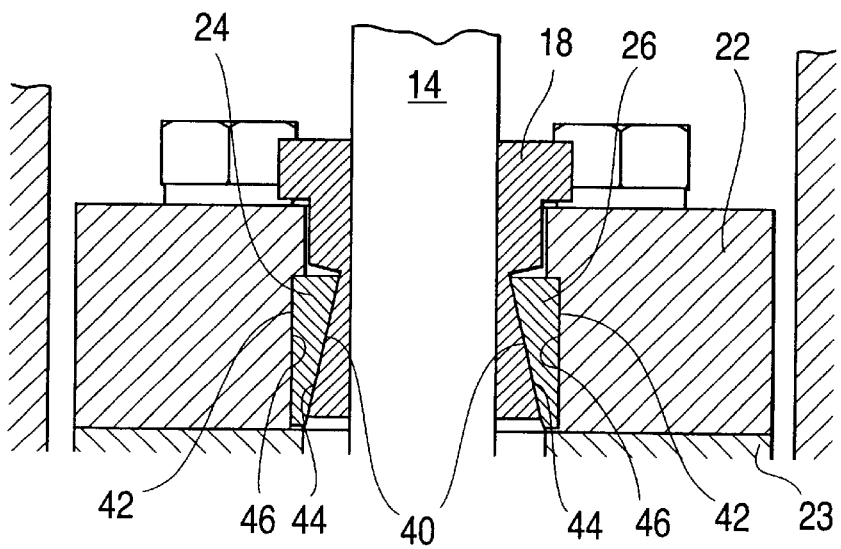

FIG. 4 is a vertical cross-sectional view taken along line 4—4 of FIG. 3 and showing the viewable and non-viewable interaction of various components of a lockout device corresponding to a preferred embodiment of the present invention; and FIG. 5 is an isometric assembly view showing the relationship of various components of a lockout device corresponding to a preferred embodiment of the present invention.

DETAILED DESCRIPTION OF A PREFERRED EMBODIMENT

Figure 1:
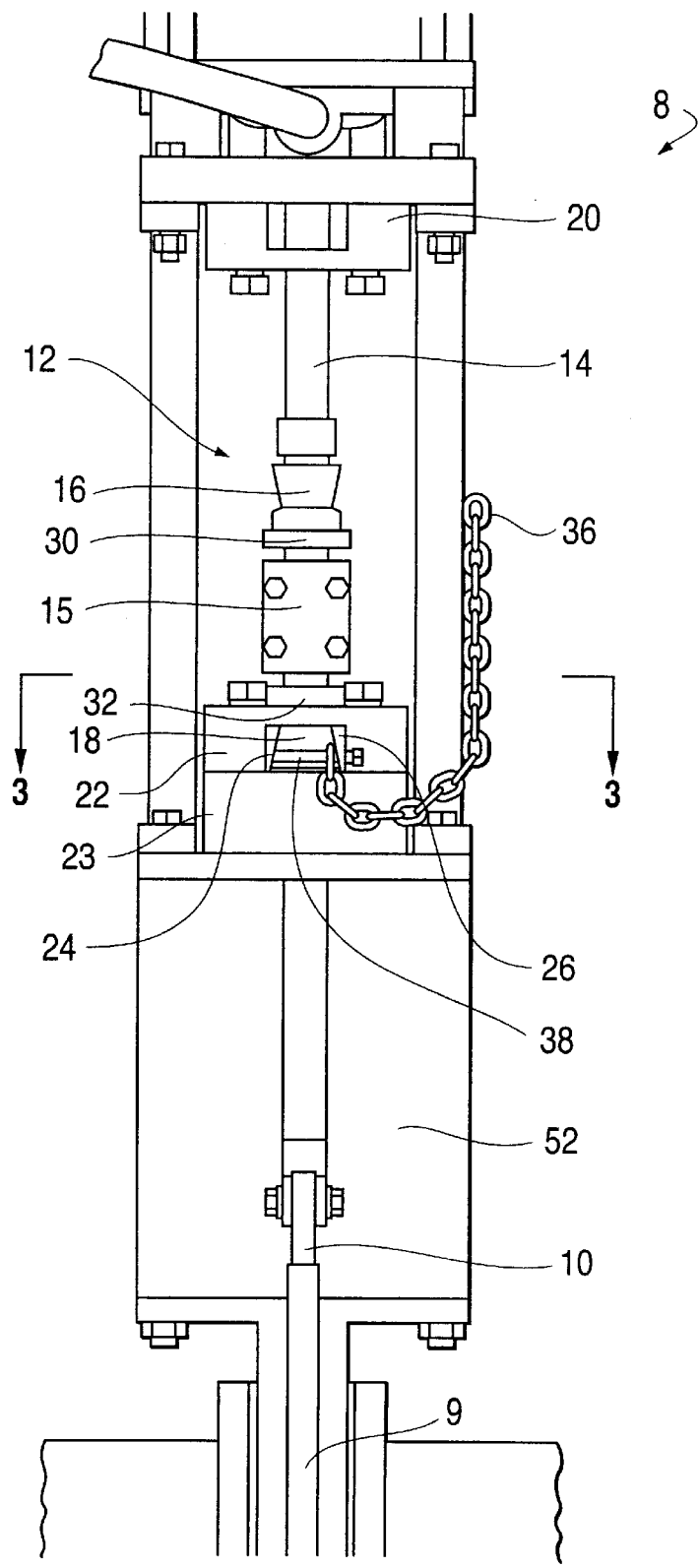
FIG. 1 is a frontal elevation showing a portion of a gate valve secured in a first position by a lockout device corresponding to a preferred embodiment of the present invention.
Figure 2:
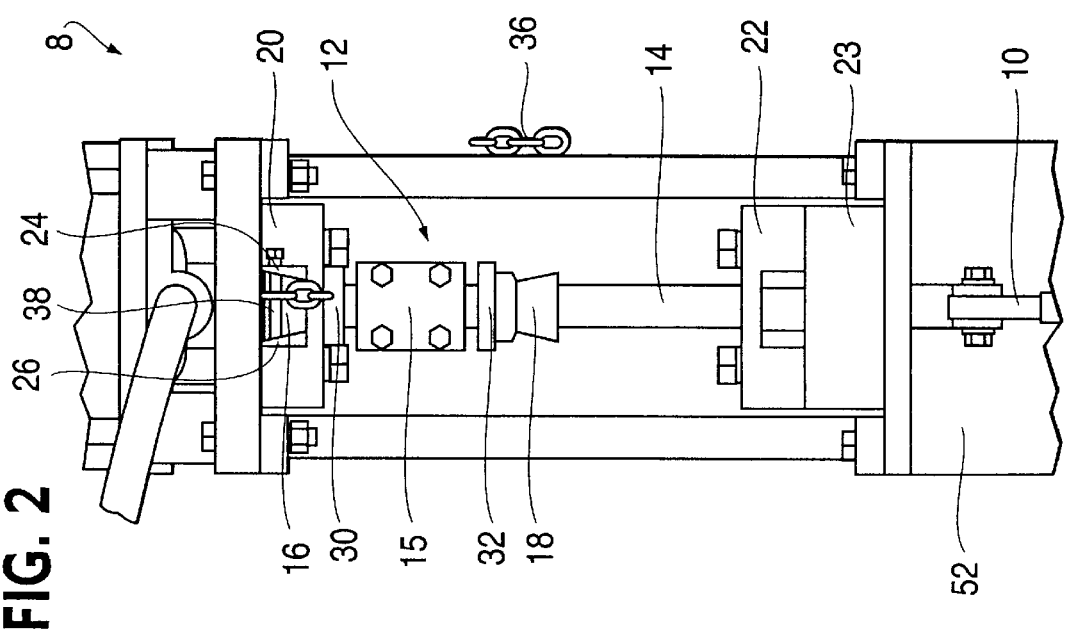
FIG. 2 is a frontal elevation showing a portion of a gate valve locked in a second position by a lockout device corresponding to a preferred embodiment of the present invention.

Referring to FIGS. 1 and 2, a gate valve 8 is shown fitted with a lockout device 12 corresponding to a preferred embodiment of the present invention and operable to lock the valve 8 in a particular, desired position and thereafter restrict valve actuation until removed. In FIG. 1, the lockout device 12 is engaged to lock the valve 8 in a first or valve-closed position; in FIG. 2, the lockout device 12 is engaged to lock the valve 8 in a second or valve-open position. The gate valve 8 is conventional and operable to regulate the flow of a material through a flowpath.

Typical of most gate valves, a shaft 14 connects at a first end to an actuator arm 10, and at a second end to a flow control mechanism 9. The shaft 14 may be a single length of material or may be two or more shaft pieces securely joined so as to perform as a single shaft. FIGS. 1 and 2 show a clamping mechanism 15 for coupling two shaft pieces to form the shaft 14. The clamping mechanism 15 is well-known in the art and is included for illustrative purposes only.

The preferred lockout device 12 broadly comprises upper and lower lock couplings 16,18; upper and lower lock plates 20,22; and first and second keys 24,26.

The upper and lower lock couplings 16,18 are securely mounted on the shaft 14 in locations corresponding with the open and closed positions, respectively, of the valve 8. Preferably, one or both of the couplings 16,18 are threaded onto the shaft 14 so as to be adjustably locatable thereon. Set screws 30,32 may be used to prevent movement of the couplings 16,18 once positioned. Thus, as desired, the lock couplings 16,18 may be located so as to produce almost any degree of valve actuation between fully open and fully closed.

As shown in FIGS. 4 and 5, each coupling 16,18 presents coupling surfaces 40 corresponding to surfaces 44 presented by the first and second keys 24,26, as described below. The coupling surfaces 40 taper in the direction of shaft travel relative to the associated valve position. To that end, the couplings 16,18 may be cylindrical with tapered cut-outs, as shown in FIG. 5. Alternatively, the portions of the couplings 16,18 presenting the coupling surfaces 40 may be substantially conically-, triangularly-, or pyramidicaly-shaped. That is, for example, the tapered cut-outs shown in FIG. 5 may be continued around the otherwise cylindrical coupling 16,18 so as to result in a fully conical portion.

The upper and lower lock plates 20,22 are stationarily secured relative to the shaft 14, operable to allow the shaft 14 to pass therethrough, and operable to receive, respectively, the upper and lower lock couplings 16,18. A sealing block 23 operates to form a seal around the shaft 14, a portion of which moves through a hydraulic/pneumatic media-filled environment 52, and thereby prevents loss and contamination of the media. The sealing block 23 is shown located below the lower lock plate 22. The sealing block 23 is well-known in the art and is included for illustrative purposes only. The lock plates 20,24 and sealing block 23 are shown secured by bolts, but may alternatively be secured by any practical and suitable means, such as welding.

Each lock plate 20,22 presents plate surfaces 42 corresponding to surfaces 46 presented by the first and second keys 24,26, as described below. The plate surfaces 42 are shown to be flat and having an engaging lip, but may alternatively be tapered similar to the coupling surfaces 40.

The keys 24,26 are preferably substantially wedge-shaped, with each key 24,26 having a tapered key surface 44 corresponding to the coupling surface 40, and a flat key surface 46 corresponding to the plate surface 42. The keys 24,26 are preferably held at respective first ends substantially parallel to one another by a spacer 38, shown as a simple bolt secured by a nut or welded in place. Alternatively, the keys 24,26 may be unconnected and present stops at their respective first ends. As shown in FIG. 3, the keys 24,26 are preferably of a length sufficient to extend completely through a plate 20,22. The keys 24,26 preferably have locking attachments at their respective second ends such that a locking mechanism, such as a padlock 50 or cotter pin, may be secured thereto. A chain 36 or other attachment means may be used to attach the keys 24,26 to the gate valve 8 to prevent their loss when not in use.

In operation, an operator desiring to lock the gate valve 8 in a particular position by preventing movement of the shaft 14 simply actuates the valve 8 as required to achieve the desired position and inserts the keys 24,26 to engage the coupling and plate surfaces 40,42. If the desired valve position cannot be achieved due to mispositioning of one or both of the couplings 16,18 on the shaft 14, the appropriate set screw 30,32 can be loosened to allow the coupling 16,18 to be threadably re-positioned on the shaft 14. The loosened set screw 30,32 should then be re-tightened.

As best shown in FIG. 4, the wedge-shaped keys 24,26 and tapered coupling surface 40 combine to convert an actuative force acting on the shaft 14 into a primarily compressive force acting on the keys 24,26, thereby preventing movement of the shaft 14. The wedge shape of the keys 24,26 and the corresponding tapered contact surface 40 allow the shaft 14 and coupling 16 to move freely when the keys 24,26 are not engaged, and yet provide a force conversion mechanism when the keys 24,26 are engaged. Thus, operation of the lockout device 12 is analogous to the operation of a common door wedge whereby a door moves freely relative to a floor until a wedge is inserted therebetween operable to convert a force acting on the door into a compressive force on the wedge and thereby prevent movement of the door in a particular direction.

Once the keys 24,26 are engaged, the operator may attach a padlock 50 to the end of one of the keys 24,26 to ensure that unauthorized or accidental withdrawal does not occur. To disengage the lockout device 12 and allow actuation of the valve 8, the keys 24,26 must be withdrawn.

Although the invention has been described with reference to the preferred embodiment illustrated in the attached drawing figures, it is noted that equivalents may be employed and substitutions made herein without departing from the scope of the invention as recited in the claims. In particular, the present invention is for a valve lockout device independent of any particular application or valve. In fact, the lockout device may be adapted to operate with virtually any type of valve having a moving actuator shaft. Furthermore, the number of keys, coupling locks, and lock plates may vary depending on the number of desired possible valve locking positions.

Having thus described the preferred embodiment of the invention, what is claimed as new and desired to be protected by Letters Patent includes the following:

1. A lockable valve comprising:

a flow control mechanism shiftable into and out of an operating position;

an actuator shaft coupled to the flow control mechanism for shifting the flow control mechanism when an actuative force is applied to the actuator shaft;

at least one lock coupling secured to the actuator shaft at a location corresponding to the operating position, the lock coupling presenting a first contact surface;

at least one lock plate stationarily secured relative to the actuator shaft and operable to allow the actuator shaft to slidably pass therethrough and to receive the lock coupling when the flow control mechanism is in the operating position, the lock plate presenting a second contact surface; and at least one key operable when the lock coupling is received within the lock plate to be inserted between the first and second contact surfaces such that a compressive force is exerted against the key by the contact surfaces when the actuative force acts on the shaft, thereby preventing the flow control mechanism from being shifted out of the operating position.

2. The lockable valve of claim 1, the lock coupling location corresponding to the operating position wherein the valve is open.

3. The lockable valve of claim 1, the lock coupling location corresponding to the operating position wherein the valve is closed.

4. A lockout device operable to lock a valve into an operating position by preventing movement of an actuator shaft associated with the valve, the lockout device comprising:
- at least one lock coupling secured to the actuator shaft at a location corresponding to the operating position, the lock coupling presenting a first contact surface;
- at least one lock plate stationarily secured relative to the actuator shaft and operable to allow the actuator shaft to slidably pass therethrough and to receive the lock coupling when the flow control mechanism is in the operating position, the lock plate presenting a second contact surface; and
- at least one key operable when the lock coupling is received within the lock plate to be inserted between the first and second contact surfaces such that a compressive force is exerted against the key by the contact surfaces when the actuative force acts on the shaft, thereby preventing the flow control mechanism from being shifted out of the operating position.

5. The lockout device of claim 4, the lock coupling being threadably positioned and repositionable on the actuator shaft.

6. The lockout device of claim 4, the lock coupling location corresponding to the operating position wherein the valve is open.

7. The lockout device of claim 4, the lock coupling location corresponding to the operating position wherein the valve is closed.

8. The lockout device of claim 4, there being two keys, each key being inserted substantially parallel to the other.

9. The lockout device of claim 4, the key having a first end and a second end, the first end presenting a stop, the second end presenting a lock attachment to which a locking mechanism may be attached, the stop and lock attachment acting together to prevent removal of the key once the key has been applied and the locking mechanism attached.

10. A lockout device operable to lock a valve into an operating position by preventing movement of an actuator shaft associated with the valve, the lockout device comprising:
- an upper lock coupling secured to the shaft at a location corresponding to a first operating position wherein the valve is closed, the upper lock coupling presenting an upper first contact surface;
- a lower lock coupling secured to the shaft at a location corresponding to a second operating position wherein the valve is open, the lower lock coupling presenting a lower first contact surface;
- an upper lock plate stationarily secured relative to the actuator shaft and operable to allow the actuator shaft to slidably pass therethrough and to receive the upper lock coupling when the valve is in the first operating position, the upper lock plate presenting an upper second contact surface;
- a lower lock plate stationarily secured relative to the actuator shaft and operable to allow the actuator shaft to slidably pass therethrough and to receive the lower lock coupling when the valve is in the second operating position, the lower lock plate presenting a lower second contact surface; and
- at least one key operable when the lock coupling is received within the lock plate to be inserted between the first and second contact surfaces such that a compressive force is exerted against the key by the contact surfaces when the actuative force acts on the shaft, thereby preventing the flow control mechanism from being shifted out of the operating position.

11. The lockout device of claim 10, at least one of the upper and lower lock couplings being threadably positioned and repositionable on the actuator shaft.

12. The lockout device of claim 10, there being two keys, each key being applied substantially parallel to the other.

13. The lockout device of claim 11, the key having a first end and a second end, the first end presenting a stop, the second end presenting a lock attachment to which a locking mechanism may be attached, the stop and lock attachment acting together to prevent removal of the key once the key has been applied and the locking mechanism attached.

* * * * *